United States Patent [19]

Kononov

[11] Patent Number: 5,366,171
[45] Date of Patent: Nov. 22, 1994

[54] VEHICLE MOUNTED REEL LIFTING, DRIVING AND BRAKING APPARATUS

[75] Inventor: Leon Kononov, Denver, Colo.

[73] Assignee: Holan Manufacturing, Inc., Westminster, Colo.

[21] Appl. No.: 96,729

[22] Filed: Jul. 23, 1993

Related U.S. Application Data

[63] Continuation of Ser. No. 792,811, Nov. 15, 1991, abandoned.

[51] Int. Cl.⁵ ............................................. B65H 75/40
[52] U.S. Cl. .................................. 242/422.2; 242/423; 242/557; 242/598.2; 242/598.4; 242/599.3
[58] Field of Search ............. 242/86.7, 86.5 R, 86.51, 242/86.52, 85, 68, 68.4

[56] References Cited

U.S. PATENT DOCUMENTS

| | | | |
|---|---|---|---|
| 3,203,640 | 8/1965 | Garnett | 242/86.7 |
| 3,226,087 | 12/1965 | Eitel | 242/86.7 |
| 3,325,119 | 6/1967 | Lehtio | 242/86.7 |
| 3,981,509 | 9/1976 | Myer | 242/68.4 X |
| 4,071,203 | 1/1978 | Sneed et al. | 242/86.7 X |
| 4,155,518 | 5/1979 | Small | 242/86.5 R |
| 4,365,768 | 12/1982 | Woodruff | 242/68.4 X |
| 4,588,142 | 5/1986 | Malzacher | 242/86.5 R |
| 4,591,309 | 5/1986 | Clapp, Jr. | 242/86.7 X |
| 4,643,370 | 2/1987 | Pierce | 242/86.7 |
| 4,659,030 | 4/1987 | Graves et al. | 242/68 X |
| 5,029,766 | 7/1991 | Emming | 242/86.5 R X |

Primary Examiner—Daniel P. Stodola
Assistant Examiner—John P. Darling
Attorney, Agent, or Firm—Flehr, Hohbach, Test, Albritton & Herbert

[57] ABSTRACT

Vehicle mounted reel lifting apparatus having a motor driven wheel framework and having a longitudinal axis, an elongate shaft is pivotally mounted on the framework so that it extends in a direction at substantially right angles to the longitudinal axis of the framework. A pair of spaced-apart arms are mounted on the shaft in spaced-apart positions. A spindle having an axis is provided, lifting claws are provided on the ends of the arms for receiving and carrying the spindle. A drive is carried by one of said arms for driving said spindle. A brake is carried by the same arm as carries the drive for applying braking forces to the spindle.

15 Claims, 3 Drawing Sheets

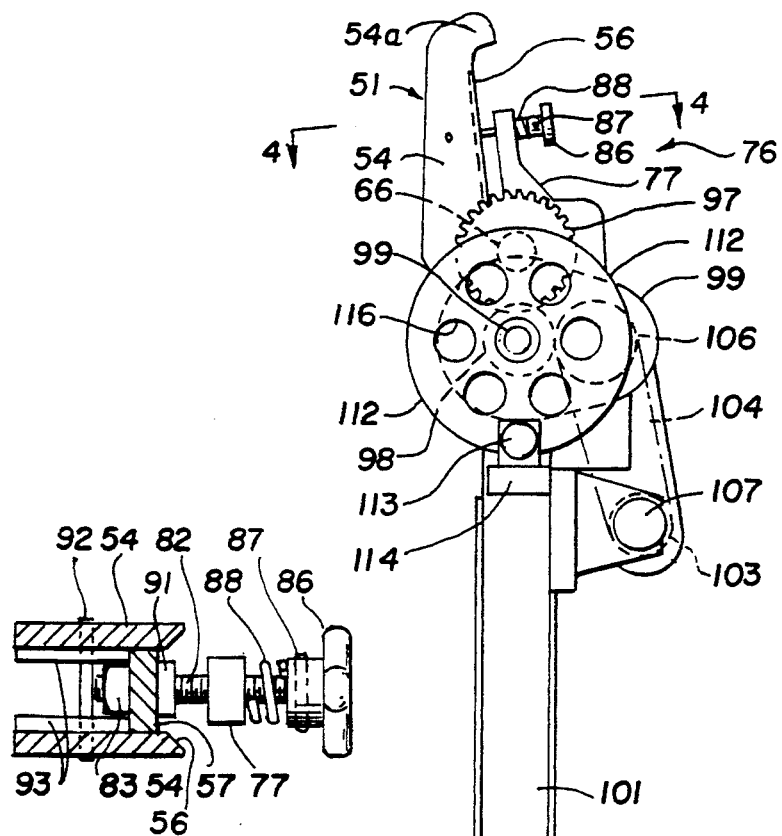
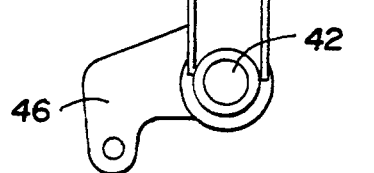
Fig. 4
Fig. 3
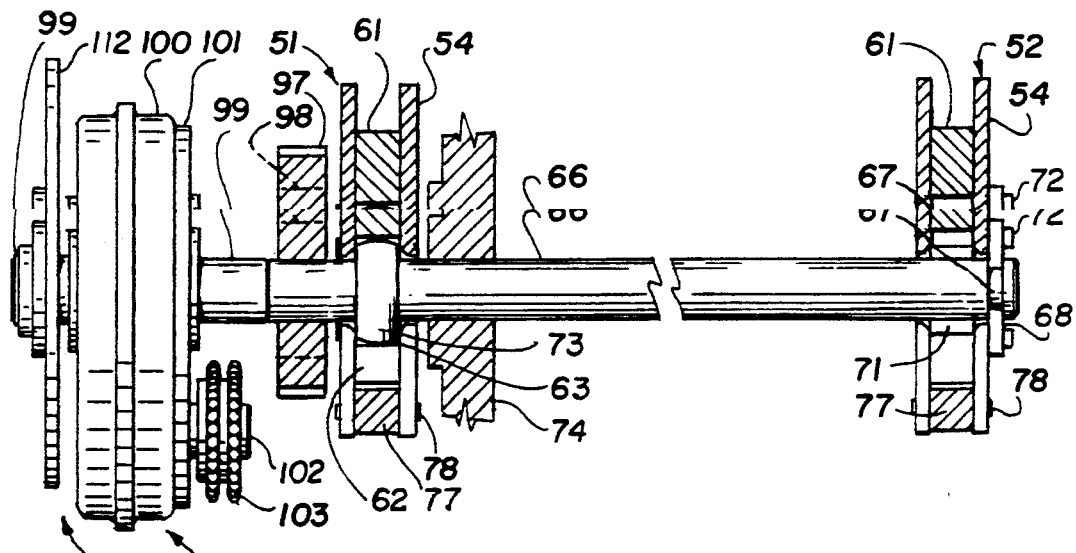
Fig. 5

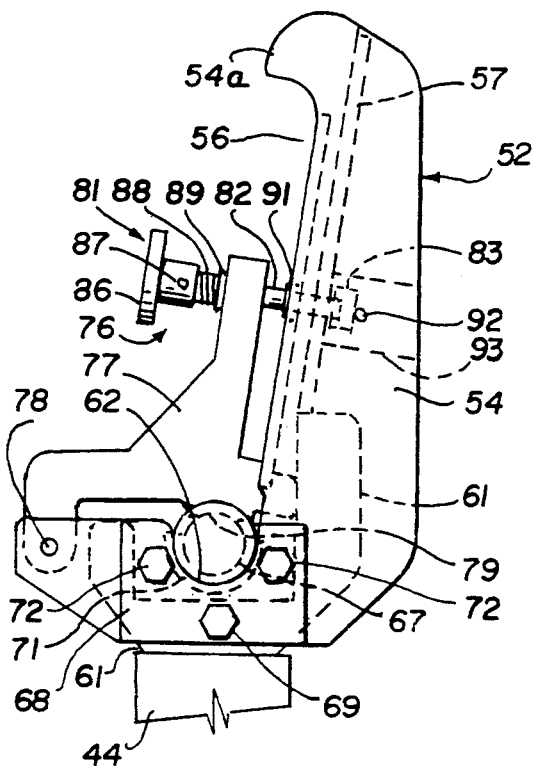
Fig. 6
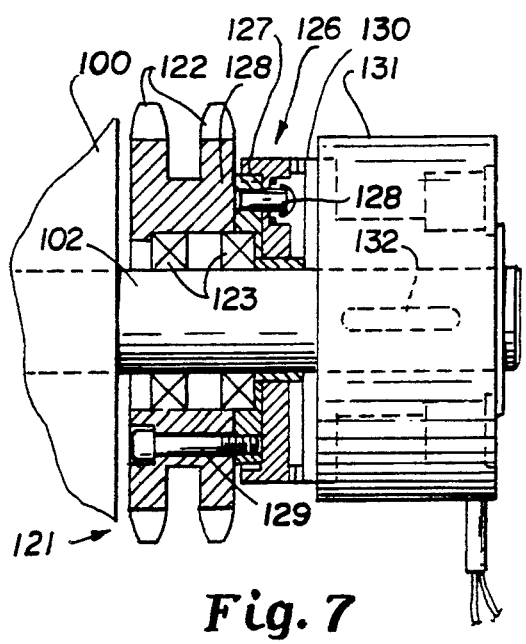
Fig. 7
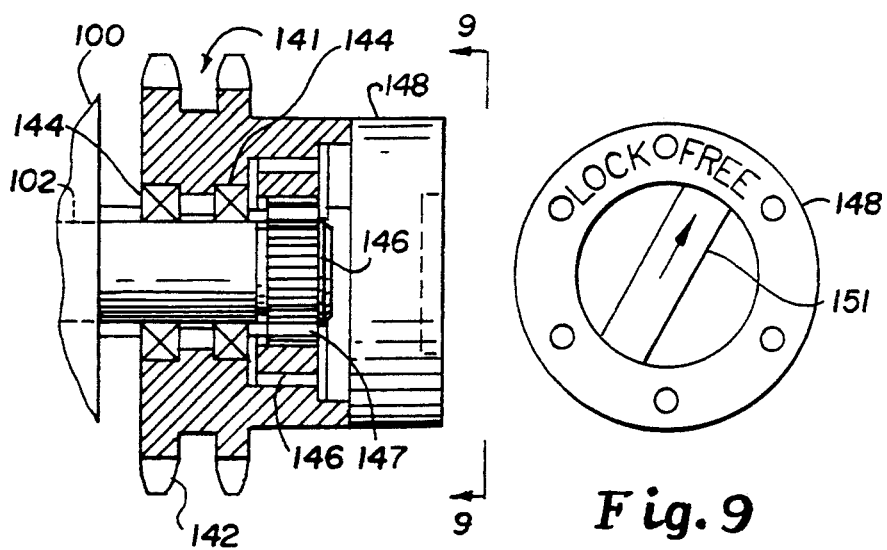
Fig. 8
Fig. 9

VEHICLE MOUNTED REEL LIFTING, DRIVING AND BRAKING APPARATUS

This is a continuation, of application Ser. No. 07/792,811 filed Nov. 15, 1991, now abandoned.

This invention relates to a vehicle mounted reel lifting, driving and braking apparatus and more particularly to such an apparatus for use in the telecommunications and power distribution industries for the construction and maintenance of cable systems.

In U.S. Pat. No. 4,155,518 there is disclosed a reel lifting apparatus in which an in-line motor drive train is utilized for driving the reel. In other types of prior art devices, rubber rollers have been utilized to drive the outer edges of the cable reels. This apparatus has a disadvantage in that only certain types of reels can be driven. Also, the rubber drive rollers have a tendency to disintegrate. The drive mechanism is relatively complex and has a relatively poor service life. Other prior art apparatus has used a spindle in the reel with driving means and braking means for the spindle. Such mechanisms have been relatively complicated and are limited in the application due to certain types of reels. Difficulties have also been encountered in loading reels onto such apparatus such as aligning the spindle on the brake side of the arm while aligning the spindle with the drive means on the other arm as disclosed in U.S. Pat. No. 4,155,518. Other prior art apparatus has used a chain drive system for driving the spindle which also has disadvantages in that such apparatus is incapable of carrying heavy reels. Also there is difficulty in removing the spindle bar. Also in such an apparatus the drive mechanism must be disengaged in order to make it possible for the reel to turn freely in one direction. There is therefore a need for a new and improved vehicle mounted reel lifting, driving and braking apparatus which overcomes the above-named disadvantages.

In general, it is an object of the present invention to provide a vehicle mounted reel lifting, driving and braking apparatus which can be utilized for lifting and carrying cable reels of various sizes.

Another object of the invention is to provide an apparatus of the above character in which a braking torque can be applied to the spindle to maintain appropriate tensioning on cable being placed with an appropriate (minimum sag) clearance above the ground.

Another object of the invention is to provide an apparatus of the above character which can be utilized for winding up used cable onto an empty cable reel.

Another object of the invention is to provide an apparatus of the above character in which the driving and braking systems are provided on the same lifting arm.

Another object of the invention is to provide an apparatus of the above character in which the spindle becomes self-aligning when loaded onto the lifting claws.

Another object of the invention is to provide an apparatus of the above character in which it is unnecessary to disengage the driving system when loading or unloading reels.

Another object of the invention is to provide an apparatus of the above character in which after the spindle is locked into position can be utilized in a motor-drive mode, a free-reeling mode and a braking mode.

Additional objects and features of the invention will appear from the following description in which the preferred embodiments are set forth in detail in conjunction with the accompanying drawings.

FIG. 3 is a cross-sectional view taken along the line 3—3 of FIG. 2.

FIG. 4 is a cross-sectional view taken along the line 4—4 of FIG. 3.

FIG. 5 is a cross-sectional view taken along the line 5—5 of FIG. 2.

FIG. 6 is an enlarged cross-sectional view taken along the line 6—6 of FIG. 2.

FIG. 7 is a side-elevational view partially in cross-section showing another embodiment of the present invention utilizing an electrical clutch for providing two-way driving.

FIG. 8 is a side-elevational view partially in cross-section of a mechanical locking device utilized in the apparatus of the present invention for two-way driving.

FIG. 9 is an end elevational view looking along the line 9—9 of FIG. 8.

Figure 1:
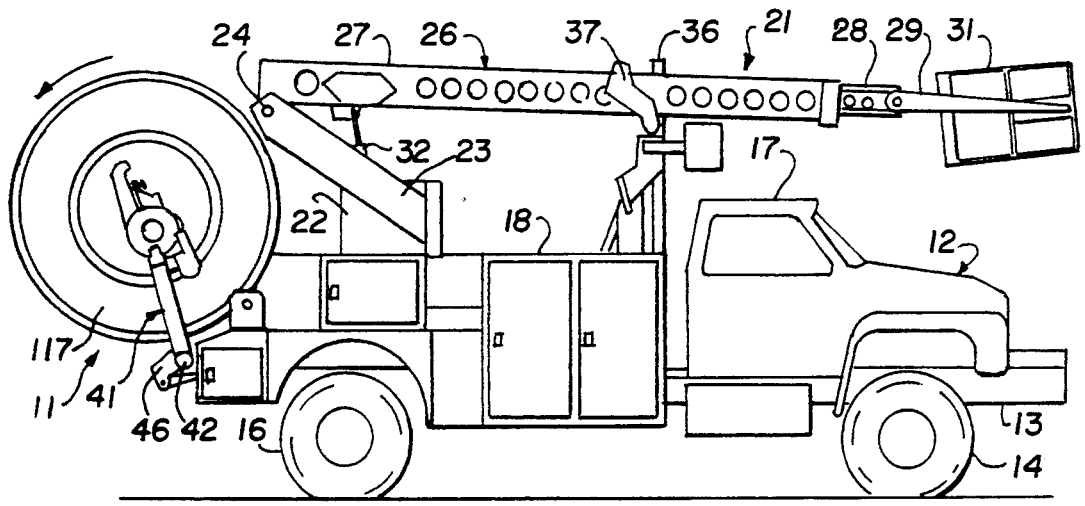
FIG. 1 is a side-elevational view of a vehicle mounted reel lifting, driving and braking apparatus incorporating the present invention.
Figure 2:
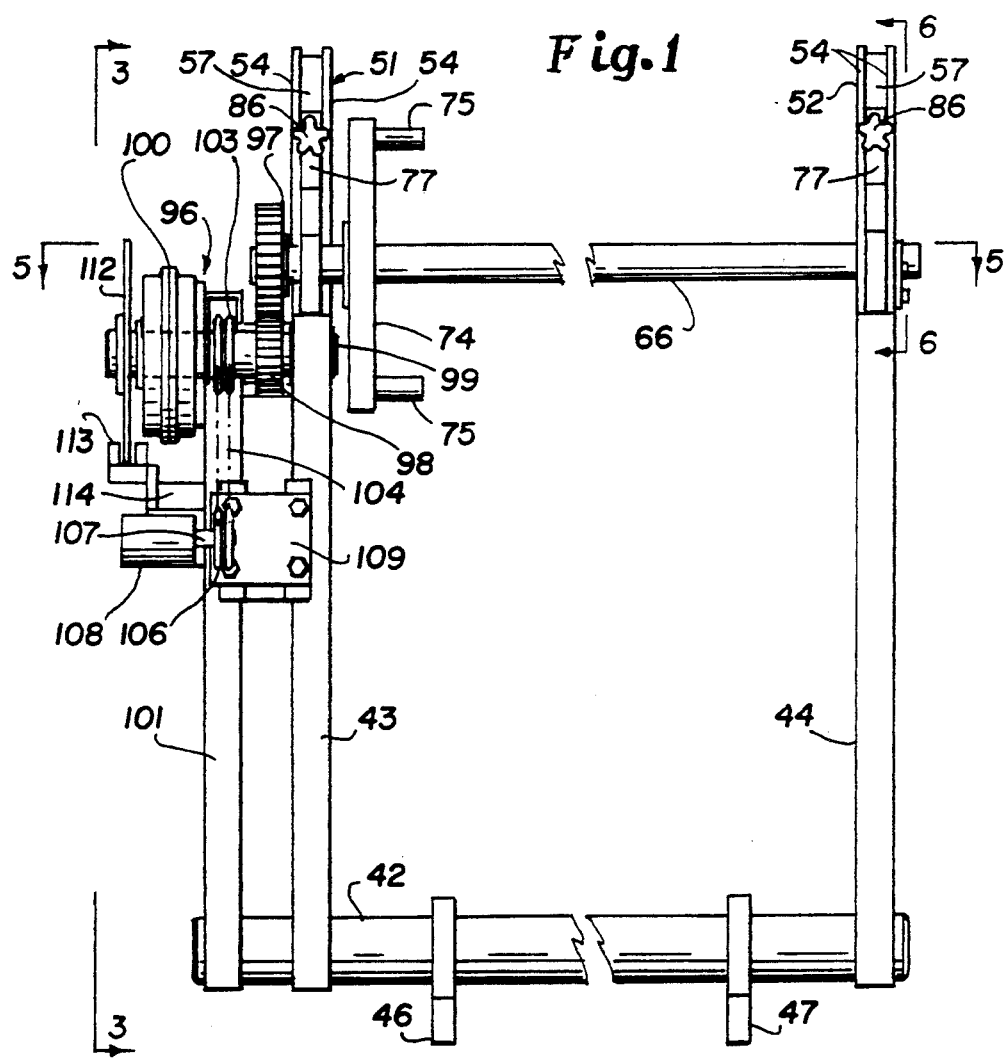
FIG. 2 is a top plan view of the apparatus shown in FIG. 1 with the reel removed.

In general, the vehicle mounted reel lifting, driving and braking apparatus consists of a vehicle having a motorized wheeled framework and having a longitudinal axis, on which an elongate shaft is provided. Means is provided for pivotally mounting said shaft on said framework so that it extends in a direction at substantially right angles to the longitudinal axis of the vehicle. A pair of spaced-apart arms are mounted on said shaft in spaced-apart positions. A spindle having an axis is provided. Lifting claw means on the ends of said arms are provided for receiving and carrying said spindle. Drive means is carried by one of said arms for driving said spindle and braking means is carried by the same arm as carries the drive means for applying braking forces to said spindle.

More in particular, the vehicle mounted reel lifting, driving and braking apparatus 11 as shown in FIGS. 1-4 consists of a vehicle 12 in the form of a truck of a conventional type. The vehicle 12 is provided with a framework 13 having front and rear wheels 14 and 16 rotatably mounted thereon. A cab 17 of conventional type is mounted on the forward extremity of the framework 13 and encloses a conventional driving station. Cabinetry 18 is provided on the framework 13 to the rear of the cab 17.

An aerial lift 21 of a conventional type is mounted upon the framework 13 and is provided with a rotatable pedestal 22 mounted upon the framework 13. The pedestal 22 is provided with a pair of arms 23 extending at an angle therefrom which are connected by a pin 24 to a telescoping boom structure 26 consisting of an outer boom 27 and inner telescoping boom 28. An arm 29 is mounted on the outer extremity of the inner boom 28 and has mounted on the outer or distal extremity thereof a workman's platform 31. Means (not shown) is provided for extending and retracting the inner boom 28 with respect to the outer boom 27. Means is also provided for raising and lowering the outer extremity of the boom structure 26 about the horizontal pivot point provided by the pin 24 and includes a hydraulic actuator 32. Means (not shown) is also provided for rotating the pedestal 22 about a vertical axis whereby the outer extremity of the boom structure 26 and the workman's platform 31 carried thereby can be raised and lowered about the horizontal axis, rotated about the vertical axis and extended and retracted toward and away from the vehicle 12. A boom support 36 is provided on the framework 13 for supporting the boom structure 26 in an at rest or at home position as shown in FIG. 1. Cable guiding apparatus 37 of a conventional type is mounted upon the framework 13 just to the rear of the cab 17.

A reel lifting, driving and braking apparatus 41 is mounted on the rear extremity of the framework 13 of the vehicle 12. The lifting apparatus consists of a large tubular shaft 42. Means (not shown) is provided for pivotally mounting the shaft 42 on the framework 13 of the vehicle and extends in a direction at right angles to the longitudinal axis of the vehicle 12. By way of example such means can consist of pivot bearing assemblies (not shown) mounted on spaced-apart positions on the rear of the framework 13. First and second spaced-apart lifting arms 43 and 44 are mounted on the shaft 42 in fixed positions on the shaft 42. Actuator arms 46 and 47 are secured to the shaft 42 and are provided for rotating the shaft 42 to cause a swinging movement of the outer ends of the arms 43 and 44. Actuation means (not shown) of a suitable type such as hydraulic actuators is connected between the framework 13 and the actuator arms 46 and 47 for operating the actuator arms 46 and 47. Actuation means such as the type disclosed in U.S. Pat. No. 4,155,518 can be utilized.

Claws 51 and 52 are secured to the distal extremities of the lifting arms 43 and 44. Each of the claws 51 and 52 is formed by a pair of spaced parallel cheek plates 54 which are secured to the arms 43 and 44 by suitable means such as welding. The cheek plates 54 are provided with hook-like upturned distal extremities 54a (see FIG. 3 and FIG. 4). The cheek plates 54 for the claw 51 are also provided with beveled surfaces 56 which are inclined inwardly toward each other for a purpose hereinafter described. A base plate 57 is provided between the cheek plates 54 and is spaced below the beveled surfaces 56 and extends in a direction parallel to the beveled surfaces 56. A bearing support member 61 which is substantially H-shaped as shown is secured to the distal extremity of the arms 43 and 44. An insert 62 formed of a suitable material such as nylon is mounted in the support members and is provided with an arcuate surface 63 which adjoins the base plate 57. The arcuate surface 63 is adapted to receive a spindle 66 which extends transversely between the two arms 43 and 44.

One end of the spindle 66 which is disposed within the claw 52 is provided with an annular notch 67 that is seated in a retaining plate 68 secured to the support member 61 in claw 52 by a cap screw 69. The spindle 66 is rotatably mounted in an insert 71 formed of a suitable material such as Nylon mounted between the cheek plates 54 and upon the support member 61 and secured therein by cap screw 72.

The other end of the spindle 66 is provided with a spherical bearing 73 which is adapted to seat upon the insert 62. A drive bar 74 is mounted on the spindle 66 so that it is disposed adjacent the lifting claw 51 and is provided with a pair of diametrically opposed drive pins 75 that are adapted to engage a cable reel as hereinafter described.

Means is provided for locking the spindle 66 in place in each of the lifting claws 51 and 52 and consists of a locking device 76. The locking device 76 consists of a locking member 77 which is pivotally mounted on a pin 78 mounted between the spaced-apart plates 54. The locking member 77 is provided with an arcuate surface 79 (see FIG. 6) which on one side is adapted to engage the curved surface of spherical bearing 73 and the locking device on the other claw is adapted to engage the annular recess or notch 67 in the spindle 66. The locking device 76 also includes a latching mechanism 81 which consists of a threaded shaft 82 which is adapted to be threaded into a nut 83 mounted on the bottom side of the base plate 57. A knob 86 is secured to the shaft 82 by a pin 87 and engages one end of a helical spring 88 provided on the shaft 82. The other end of the spring 88 is supported by a conical washer 89 (see FIG. 6) which engages the member 77. A washer 91 is provided on shaft 82 on the other side of the member 77 to prevent the shaft 82 from being withdrawn from the locking member 77. The nut 83 is held in place by a removable pin 92 extending through the cheek plates 54. The nut 83 is prevented from rotating by a pair of spaced apart plates 93 disposed on opposite sides of the nut 83 and extending between the cheek plates 54.

Driving means 96 is provided for driving the spindle and consists of a large spur gear 97 which is directly mounted on and secured to the spindle 66. The large spur gear 97 is driven by a small spur gear 98. The spur gear 98 is driven by the output shaft 99 from a single step speed reducer 100 which is mounted upon the support arm 101 that is mounted on the shaft 42 in close proximity to the arm 43 but spaced therefrom. The input shaft 102 of the single step speed reducer 100 is driven by a double or single-direction or one-way sprocket 103 mounted thereon. The double sprocket 103 can be of a suitable type such as Part No. MB20060B21T manufactured by Lowell Corporation of Worcester, Mass. 01613. The double sprocket 103 is driven by a pair of roller chains 104. The roller chains 104 are driven by a double sprocket 106 mounted on the output shaft 107 of a hydraulic motor 108 mounted upon a support plate 109 provided on the arms 43 and 101.

Braking means 111 is provided for applying braking forces to the spindle 66 and consists of a brake disc 112 which is also mounted on the output shaft 99 of the single step speed reducer 100 on the side opposite on which the spur gear 98 is mounted. A caliper brake 113 is provided for engaging the brake disc 112 and is mounted on a support post 114 mounted on the support arm 101. Lightening holes 116 are provided in the disc 112 and are spaced apart circumferentially. The caliper brake 113 can be operated in a suitable manner such as hydraulically.

Operation and use of the vehicle mounted reel lifting, driving and braking apparatus may now be briefly described as follows. Let it be assumed that it is desired to pick up a reel 117 which is on the ground. The vehicle 12 is operated to position the lifting apparatus 41 so it is in close proximity to the reel 117 to be picked up. The hydraulic actuators then can be utilized to lower the lifting arms 43 and 44. The reel carrying spindle 66 is then removed from the lifting apparatus 41 by opening the locking devices 76. The spindle 66 is then inserted into one end of the reel 117 until the pins 75 carried by the drive bar 74 are in engagement with the reel. The vehicle 12 is backed up so that the claws 51 and 52 carried by the arms 43 and 44 underlie the spindle 66. The spindle 66 is then generally positioned so that the spherical bearing 73 on one end is in alignment with the lifting claw 51 and the annular notch 67 on the other end is in alignment with the lifting claw 52.

As the arms 43 and 44 are raised and come into engagement with the spherical bearing 73, the beveled surfaces 56 provided on the plates 54 have a tendency to cause the spindle 66 to be centered longitudinally of the axis of the spindle 66 in the lifting claw 51. As further raising of the lifting claw 51 occurs, the spherical bearing 73 will roll down the base plate 57 until it comes to rest at its final position within the nylon U-shaped insert 62 provided in the bearing support member 61. The spindle 66 can then be locked in position by use of the locking devices 76 and tightening of the threaded shafts 82. Thereafter, the reel 117 can be raised into its uppermost position as indicated in FIG. 1 of the drawings.

The reel 117 can then be driven to the desired work site by operation of the vehicle 12. The reel 117 can then be lowered to the desired position by operation of the lifting apparatus 41. The driving means 96 and the braking means 111 can then be operated for the dispensing of cable from the reel 117 or the taking up of cable onto an empty reel 117. The driving means provided makes it possible to drive the reel 117 in a single direction, while at the same time allowing free turning of the reel 117 in the same direction. Rotation of the reel can be controlled by the braking means 111 by the use of the hydraulic operated caliper brake 113 engaging the disc 112 so that braking forces can be applied directly to the reel to control its rotation. The vehicle mounted reel lifting, driving and braking apparatus 11 hereinbefore described has a number of advantages. By providing both the driving means 96 and the braking means 111 on the same lifting arm 43 it is only necessary to align the spindle 66 with respect to that one arm which is accomplished by use of the spherical bearing mounted on the spindle. Once the spindle is loaded onto the lifting claws 51 and 52 the spindle is self-aligned and it rolls automatically into its final position as the lifting arms 43 and 44 are raised. The spindle can then be readily locked into place by use of the locking devices 76.

In certain embodiments of the present invention it is desirable to provide apparatus of the present invention in which it is possible to rotate the reel 117 in both directions so that cable can be fed off from the bottom or the top of the reel. Such an alternative embodiment can be provided as shown in FIG. 7 in which an electromagnetic clutch 121 is provided for two-way driving. A double sprocket 122 is mounted on the input shaft 102 of the speed reducer 100 as shown in FIG. 7. The sprocket 122 is rotatably mounted on the shaft 102 by bearings 123. The electromagnetic clutch assembly 121 also includes an electromagnetic clutch 126 consisting of a first part 127 which is secured by pins 128 and cap screw 129 to the sprocket 122. The clutch 126 also consists of a second part 130 which receives the first part and which is secured to a coil 131 which is keyed to the shaft 102 by a key 132. Thus it can be seen that when the coil 131 of the clutch 126 is energized, the clutch 126 is engaged so that the sprockets 122 are directly connected to the shaft 102 and drive the shaft 102 by providing a reversible drive motor 107 for driving the sprockets 122. It can be seen that the shaft 102 can be driven in clockwise or counterclockwise directions depending upon the direction of rotation of the hydraulic motor so that cable can be payed from a reel 117 carried on the spindle 66 either from the top or bottom of the reel as desired. When a free-reeling action is desired for the spindle, it is merely necessary to de-energize the coil 131 of the electromagnetic clutch 126 so that the spindle 66 is free to rotate in either clockwise or counterclockwise directions.

The electromagnetic clutch 126 is of a conventional type as, for example, can be part No. 60195SFTC 525-12V, such as supplied by SEPAC of 453 East Clinton Street of Elmira, N.Y. 49001.

Similar two-way driving and free-reeling can be obtained by a mechanical locking device 141 such as shown in FIGS. 8 and 9. The mechanical locking device 141 consists of a double sprocket 142 which is rotatably mounted on the shaft 102 by bearings 144. The shaft 102 is provided with splines 146 which is connected to the hub 147 of a conventional hublock 148 such as supplied by Warn Industries of 13270 S.E. Peasant Court, Milwaukie, Ore. 97222, supplied as Part No. 25550. Such a hublock 148 is provided with a handle 151 which is adapted to be rotated between the locked and free positions as shown in FIG. 7 which in a locked position serves to directly couple the double sprocket 142 to the shaft 102 so that the shaft can be rotated in either clockwise or counterclockwise direction depending upon the direction of rotation of the reversible hydraulic motor 107 to thereby permit cable to be payed off of a reel either from the bottom or the top of the reel. Similarly when freedom of rotation of the spindle is desired, the handle 151 can be moved to the free position permitting the shaft 102 to rotate freely with respect to the double sprocket 142. Thus in addition to the operation as hereinbefore described in conjunction with the vehicle mounted reel lifting, driving and braking apparatus there can be readily provided for driving the spindle in either of two directions, namely, clockwise and counterclockwise directions permitting cable to be payed off from the bottom or the top of a reel. Similarly, when desired freedom of movement of the reel can be provided when it is desired to permit free rotation of the reel.

The relatively simple design of the apparatus eliminates the need to engage or disengage the driving system when loading or unloading reels since this occurs automatically because the large drive spur gear is carried by the spindle 66 and is separated from the small drive spur gear when the spindle is removed from the lifting claws 51 and 52. After the spindle has been locked into the desired position by the locking devices the apparatus can be utilized in a variety of ways, in motor driven operations, free-reeling operations and braking operations. Thus it can be seen that the apparatus of the present invention makes it possible to lift and carry cable reels on an aerial lift truck. It is also possible to provide braking torque on the spindle to maintain the proper tension for placing the cable with the required above-ground clearance to provide a minimum sag. The apparatus can also be utilized for winding up used cable onto an empty cable reel.

What is claimed is:

1. In a vehicle mounted reel lifting apparatus for use in loading and unloading a reel, a vehicle having a motor driven wheeled framework and having a longitudinal axis, an elongate shaft, means pivotally mounting said shaft on said framework so that it extends in a direction at substantially right angles to the longitudinal axis of the vehicle, means for rotating the shaft, a pair of spaced-apart arms mounted on said shaft in spaced-apart positions, a spindle having first and second ends and an axis and adapted to extend through the reel, lifting claw means on the end of each of said arms for receiving and carrying said spindle in an at-home position, drive means for driving said spindle, said drive means including first and second gears, means mounting said first gear on one of said arms, means securing said second gear to the first end of said spindle, motor and brake means carried by said one arm and coupled to said first gear for applying driving or braking forces to said first gear and cooperative means carried by the lifting claw means on said one arm and the spindle including a spherical bearing mounted on said spindle and inclined surfaces formed on said lifting claw means adapted to be engaged by said spherical bearing whereby when a spindle having a reel mounted thereon overlies the lifting claw means in general registration therewith and the arm thereafter is raised the spherical bearing will come into engagement with the inclined surfaces formed on the lifting claw means and will roll on the inclined surfaces to the at-home position to cause the spindle to be centered longitudinally and to bring the first and second gears into registration.

2. An apparatus as in claim 1 wherein said drive means is carried by only one of said arms and wherein said braking means is carried by only the same said one arm that carries the drive means.

3. Apparatus as in claim 1 wherein said drive means includes means for permitting said spindle to be driven in a single direction and for permitting free turning of said spindle in said single direction without disengaging the drive means from said spindle.

4. Apparatus as in claim 1 wherein said lifting claw means includes a pair of spaced-apart parallel plates and a base plate mounted between the spaced parallel plates and adapted to be engaged by the spherical bearing and serving to guide the spherical bearing in its travel along the lifting claw means as the claw means is raised.

5. Apparatus as in claim 4 wherein said plates are provided with inclined surfaces adapted to be engaged by the spherical bearing.

6. Apparatus as in claim 1 together with locking means carried by each of said arms for locking said spherical bearing in said at-home position.

7. In a vehicle mounted reel lifting apparatus, a wheeled framework having a longitudinal axis, a shaft, means pivotally mounting said shaft on said framework so that it extends in a direction at right angles to the longitudinal axis of the framework, a pair of spaced-apart lifting arms mounted on said shaft, a spindle having an axis, lifting claws on the end of said arms adapted to engage and retain said spindle, said spindle and one of said lifting claws having cooperative mating means for causing registration of said spindle in a direction longitudinally of the axis of the spindle with respect to the lifting claw, said cooperative mating means including a spherical bearing mounted on said spindle and an arcuate recess disposed on said lifting claw and having inclined surfaces mating with said spherical bearing.

8. Apparatus as in claim 7 wherein said inclined surfaces include a pair of spaced parallel plates having beveled surfaces thereon and a base plate disposed between the two spaced parallel plates and having a surface engageable by the spherical bearing.

9. Apparatus as in claim 7 wherein said lifting claws include arcuate bearing support means adapted to receive the spindle and means for locking said spindle in said arcuate bearing support means.

10. Apparatus as in claim 7 together with drive means mounted on one of said lifting arms and engaging said spindle for driving said spindle and braking means mounted on said one lifting arm for applying braking forces to said spindle.

11. Apparatus as in claim 7 together with drive means mounted on one of said lifting arms for driving said spindle in one direction and permitting free rotational movement of the spindle in said same one direction.

12. Apparatus as in claim 7 together with drive means mounted on one of said lifting arms for driving said spindle in either clockwise or counterclockwise rotational directions, said drive means also including means for selectively permitting free rotational movement of the spindle in either clockwise or counterclockwise directions.

13. Apparatus as in claim 12 wherein said drive means includes an electromagnetic clutch.

14. Apparatus as in claim 12 wherein said drive means includes a mechanical locking device.

15. In a vehicle mounted reel lifting apparatus for use in loading and unloading a reel, a wheeled framework having a longitudinal axis, an elongate shaft, means pivotally mounting said shaft on said framework so that it extends in a direction at substantially right angles to the longitudinal axis of the framework, means for rotating the shaft, a pair of spaced-apart arms mounted on said shaft, a spindle having a longitudinal axis and adapted to extend through the reel, lifting claw means on the end of said arms for receiving and carrying said spindle in an at-home position and cooperative means carried by the lifting claw means on one of said arms and the spindle for causing the spindle when placed in general registration with the lifting claw means and the arms thereafter raised to move along its longitudinal axis relative to the lifting claw means into its at-home position.

* * * * *